United States Patent
Chang et al.

(10) Patent No.: US 9,091,821 B2
(45) Date of Patent: Jul. 28, 2015

(54) DEVICE AND METHOD OF FOCUSING ON POINTS OF OBJECTS

(75) Inventors: Chih-Kuang Chang, New Taipei (TW); Xian-Yi Chen, Shenzhen (CN); Zhong-Kui Yuan, Shenzhen (CN); Xiao-Guang Xue, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 827 days.

(21) Appl. No.: 13/327,775

(22) Filed: Dec. 16, 2011

(65) Prior Publication Data

US 2012/0274763 A1    Nov. 1, 2012

(30) Foreign Application Priority Data

Apr. 26, 2011    (CN) .......................... 2011 1 0105141

(51) Int. Cl.
*H04N 7/18* (2006.01)
*G02B 7/38* (2006.01)
*G01B 11/03* (2006.01)

(52) U.S. Cl.
CPC . *G02B 7/38* (2013.01); *G01B 11/03* (2013.01)

(58) Field of Classification Search
None
See application file for complete search history.

(56) References Cited

U.S. PATENT DOCUMENTS

| 2003/0015660 A1* | 1/2003 | Shishido et al. .............. 250/311 |
| 2003/0179445 A1* | 9/2003 | Maenle et al. ................ 359/368 |
| 2009/0076771 A1* | 3/2009 | Chang et al. .................. 702/152 |
| 2010/0025566 A1* | 2/2010 | Hargrove et al. .......... 250/201.2 |
| 2010/0073550 A1* | 3/2010 | Chang et al. .................. 348/349 |
| 2010/0096539 A1* | 4/2010 | Chang et al. ............... 250/252.1 |
| 2010/0158496 A1* | 6/2010 | Chang et al. .................. 396/125 |

FOREIGN PATENT DOCUMENTS

| CN | 101762232 A | 6/2010 |
| TW | 201027157 A1 | 7/2010 |
| TW | 201040490 A1 | 11/2010 |

\* cited by examiner

*Primary Examiner* — Sath V Perungavoor
*Assistant Examiner* — Kate Luo
(74) *Attorney, Agent, or Firm* — Novak Druce Connolly Bove + Quigg LLP

(57) ABSTRACT

A measuring device and method is used to select focusing points on an object. A CCD of the measuring device is positioned at the top of an initial focusing range, then moves to the bottom of the initial focusing range at a first speed to capture first images of the object. Image points corresponding to each focusing point in the first images are identified to compute coordinates of a first focal point of each focusing point. The initial focusing range is updated according to Z-coordinates of the first focal points. The CCD is positioned at the bottom of the updated focusing range, then, moves to the top of the updated focusing range at a second speed to capture second images of the object. Image points corresponding to each focusing point in the second images are identified to compute coordinates of a second focal point of each focusing point.

18 Claims, 10 Drawing Sheets

The area formula:

$$\int_a^b f(x)dx \approx \frac{1}{2}(y_0 + y_1)\Delta x + \frac{1}{2}(y_1 + y_2)\Delta x + \cdots + \frac{1}{2}(y_{n-1} + y_n)\Delta x = \frac{b-a}{n}[\frac{1}{2}(y_0 + y_n) + y_1 + y_2 + \cdots + y_{n-1}]$$

DEVICE AND METHOD OF FOCUSING ON POINTS OF OBJECTS

BACKGROUND

1. Technical Field

Embodiments of the present disclosure relate to a vision measuring technology, and more particularly to a device and a method of focusing on one or more points of an object.

2. Description of Related Art

Vision measurement methods are widely used in industrial settings for their precision, accuracy, and speed. When measuring an object using a vision measuring method, a charge coupled device (CCD) may be used for capturing images of the object. The images captured by the CCD are then transmitted to a computer, and a measuring program installed in the computer measures the object using the images. For measuring the object accurately, high quality images of the object are needed. Focusing is very important in capturing the high quality images.

BRIEF DESCRIPTION OF THE DRAWINGS

FIG. 10 shows a formula of computing an area of a closed area.

DETAILED DESCRIPTION

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable media include CDs, DVDs, BLU-RAY, flash memory, and hard disk drives.

Figure 1:
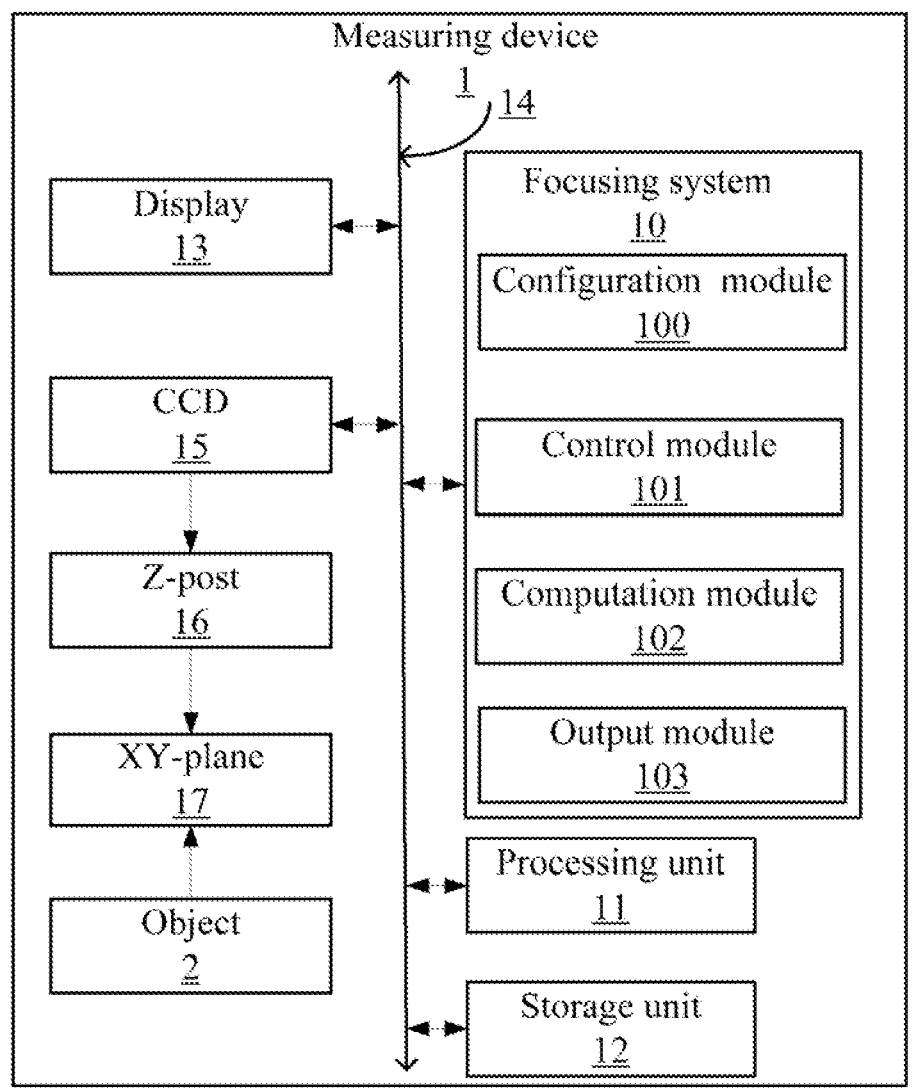
FIG. 1 is a block diagram of one embodiment of a measuring device.

FIG. 1 is a block diagram of one embodiment of a measuring device 1. The measuring device 1 may include components such as a focusing system 10, a processing unit 11, a storage unit 12, a display 13, and a bus 14. The measuring device 1 may further include a charge coupled device (CCD) 15, a Z-post 16, and an XY-plane 17. The CCD 15 is positioned at the Z-post 16, and is movable along the Z-post 16. The Z-post 16 is perpendicular to the XY-plane 17. An object 2 is positioned on the XY-plane 17 such that the object 2 that are to be imaged are directly below (in view) of the CCD 15. Movement of the CCD 15 along (up or down) the Z-post 16 will place the CCD 15 nearer or further away from the object 2. One skilled in the art would recognize that the measuring device 1 may be configured in a number of other ways and may include other or different components. The measuring device 1 may be a vision measuring machine (VMM).

In other embodiments, the CCD 15, the Z-post 16, and the XY-plane 17 may be omitted from the measuring device 1, but may be included in an independent VMM which communicates with the measuring device 1 using a network.

The focusing system 10 includes a number of function modules which may include computerized code in the form of one or more programs. The function modules may be a configuration module 100, a control module 101, a computation module 102, and an output module 103. The function modules 100-103 provide functions of computing a focal point of each focusing point of the object 2. It may be understood that, a focusing point is a point on the object 2. Detailed functions of the function modules 100-103 are illustrated below referring to FIG. 2 to FIG. 10.

The processing unit 11 may include a processor, a microprocessor, an application-specific integrated circuit (ASIC), and a field programmable gate array, (FPGA) for example. The processing unit 11 may execute the computerized code of the function modules 100-103 of the focusing system 10 to realize the functions of the function modules 100-103.

The storage unit 12 may include a random access memory (RAM) or other type of dynamic storage device, a read only memory (ROM) or other type of static storage device, a flash memory, such as an electrically erasable programmable read only memory (EEPROM) device, and/or some other type(s) of computer-readable storage medium, such as a hard disk drive, a compact disc, a digital video disc, or a tape drive. The storage unit 12 stores the computerized code of the function modules 100-103 of the focusing system 10 for execution by the processing unit 11. The storage unit 12 may also be used to store temporary variables/data or other intermediate information, during execution of the computerized codes by the processing unit 11.

The display 13 may be a monitor, which provides a user interface (UI), which can be used by a user to configure parameters of the focusing system 10, such as a focusing range and a computing area, which are mentioned and defined below. The display 13 can display various images of the object 2.

The bus 14 permits communication among the components, such as the focusing system 10, the processing unit 11, the storage unit 12, and the display 13.

Figure 2:
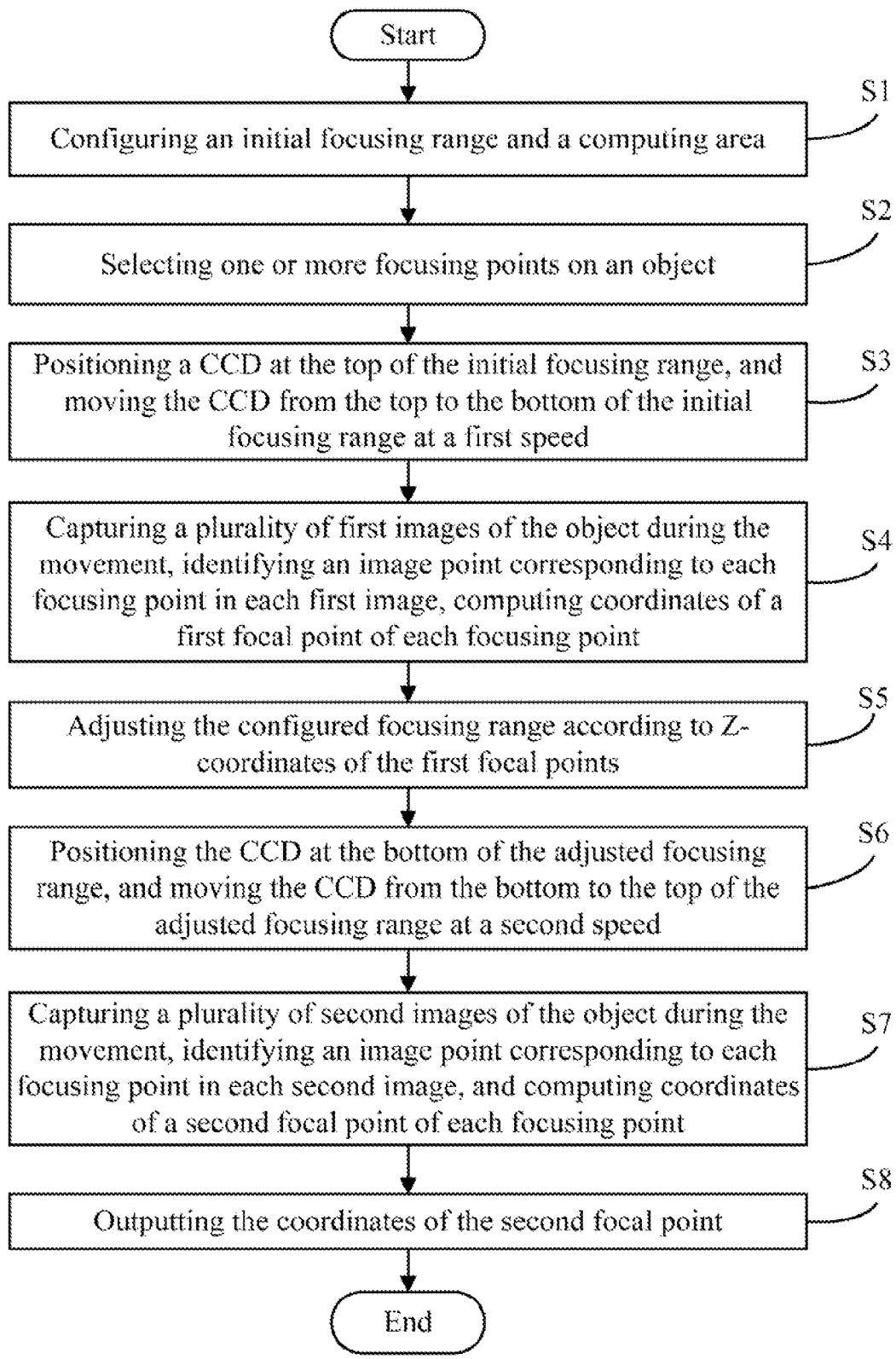
FIG. 2 is a flowchart of one embodiment of a method of focusing on points of objects.

FIG. 2 is a flowchart of one embodiment of a method of focusing on points (hereinafter called focusing points) of the object 2. Depending on the embodiment, additional steps may be added, others removed, and the ordering of the steps may be changed.

Figure 3:
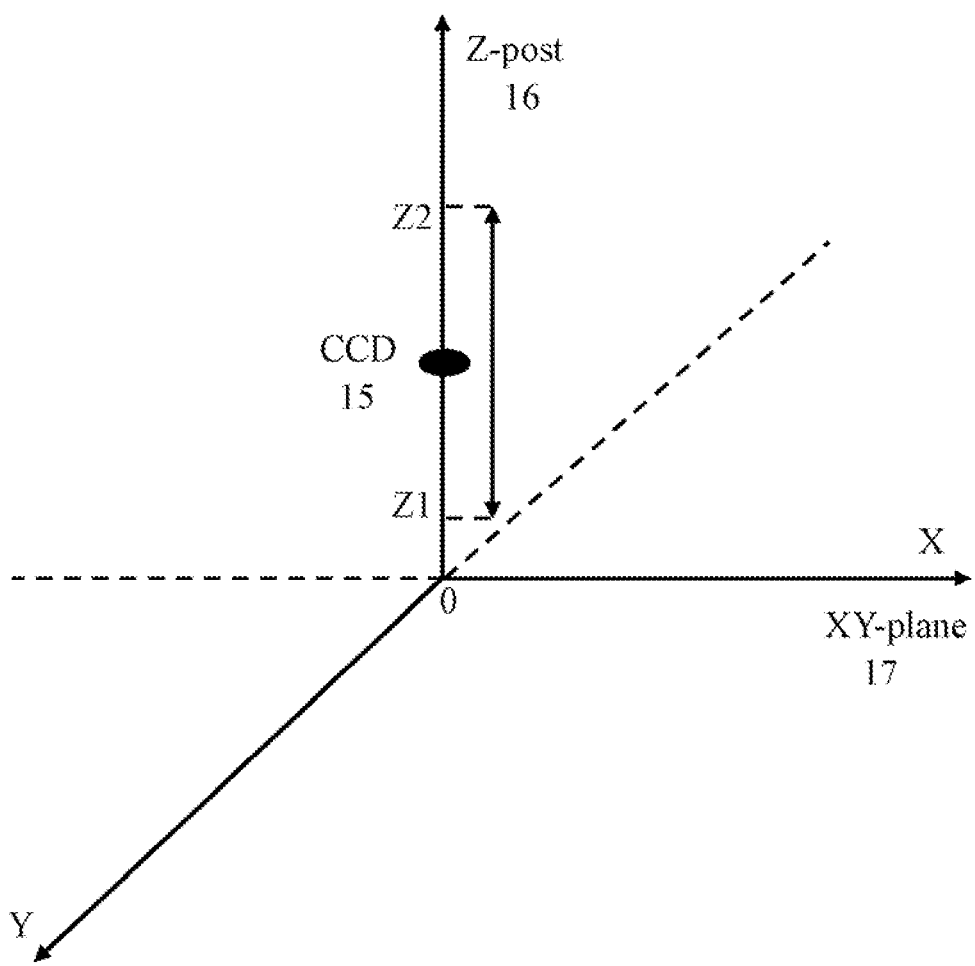
FIG. 3 is an example of a focusing range.

In step S1, the configuration module 100 is used to set an initial focusing range of the CCD 15 and set a computing area according to inputs of a user. Referring to FIG. 3, the focusing range (Z1, Z2) is a range of movement of the CCD 15 along the Z-post 16. The computing area may be M*N pixels, which is used to compute definitions of image points corresponding to the focusing points. It may be understood that, an image point is a point in an image of the object 2 corresponding to a focusing point on the object 2.

In step S2, one or more focusing points are selected on the object 2. In one embodiment, the one or more focusing points may be selected by a selection module (not shown) in the focusing system 10.

In step S3, the control module 101 positions the CCD 15 at the top of the initial focusing range, such as Z2 in FIG. 3, then moves the CCD 15 from the top to the bottom of the initial focusing range, such as from Z2 to Z1 in FIG. 3, at a first speed. The first speed may be 9 millimeters per second (minis) for example.

In step S4, the CCD 15 captures a plurality of first images of the object 2 during the movement from the top to the bottom of the initial focusing range. The computation module 102 identifies an image point corresponding to each focusing point in each first image, computes coordinates of a first focal point of each focusing point according to the image points. It may be understood that, a focal point of a focusing point ideally is the best point (distance) to set the CCD 15 from the focusing point for capturing high quality image of the focusing point. A detailed description of step S4 is illustrated below referring to FIG. 4. However to even further fine-tune the placement of the CCD 15 to ensure the clearest possible images of the focusing points, the process below from step S5 to S7 are implemented using the first focal points computed using the first images.

In step S5, the computation module 102 updates the initial focusing range according to Z-coordinates of the first focal points to generated an updated focusing range.

In step S6, the control module 101 positions the CCD 15 at the bottom of the updated focusing range, then, moves the CCD 15 from the bottom to the top of the updated focusing range at a second speed. In one embodiment, the second speed is slower than the first speed, and may be 4.5 mm/s, for example.

In step S7, the CCD 15 captures a plurality of second images of the object 2 during the movement from the bottom to the top of the updated focusing range. The computation module 102 identifies an image point corresponding to each focusing point in each second image, computes coordinates of a second focal point of each focusing point according to the image points in the second images. A detailed description of step S7 is similar to the detailed description of step S4, thus, FIG. 4 may be helpful in understanding step S7.

In step S8, the output module 103 outputs the coordinates of the second focal points of the focusing points using the display 13.

Figure 4:
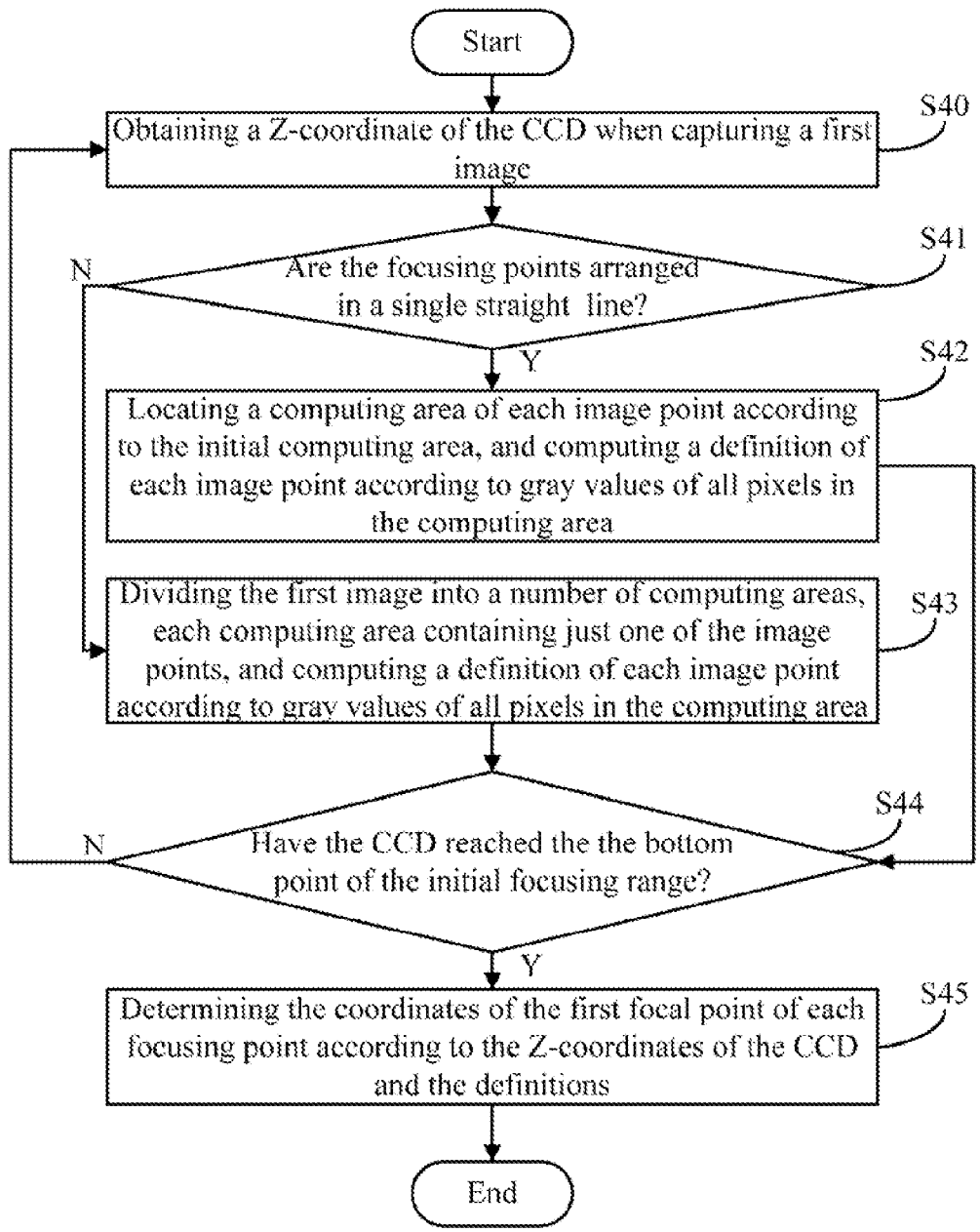
FIG. 4 is a flowchart of one embodiment of a detailed description of step S4 in FIG. 2.

FIG. 4 is a flowchart of one embodiment of a detailed description of step S4 in FIG. 2. Depending on the embodiment, additional steps may be added, others removed, and the ordering of the steps may be changed.

In step S40, the computation module 102 obtains a Z-coordinate of the CCD 15 when the CCD 15 captures a first image of the object 2.

In step S41, the computation module 102 determines if the focusing points are arranged in a single line. Step S42 is implemented if the focusing points are arranged in a single straight line. Otherwise, step S43 is implemented if the focusing points are not arranged in a single straight line, but in more than one straight line.

In step S42, the computation module 102 locates a computing area of each image point in the first image according to the configured computing area, and computes a definition of each image point according to gray values of all pixels in the corresponding computing area. Then the procedure goes to step S44. A detailed description of step S42 is illustrated below referring to FIG. 5.

In step S43, the computation module 102 equally divides the first image into a number of computing areas, each computing area containing just one of the image points, and computes a definition of each image point according to gray values of all pixels in the corresponding computing area. In one embodiment, the definition of an image point A is computed using the formula: definition=$\Sigma\{Abs[g(x-1, y)-g(x+1, y)]+Abs[g(x, y-1)-g(x, y+1)]\}$, where $g(x, y)$ is a gray value of a pixel $(x, y)$ in the computing area of the image point A. Then step S44 is performed next.

In step S44, the computation module 102 determines if the CCD 15 has reached the bottom of the initial focusing range. Step S40 is repeated if the CCD 15 has not reached the bottom of the initial focusing range. Otherwise, step S45 is implemented if the CCD 15 has reached the bottom of the initial focusing range.

In step S45, the computation module 102 determines the coordinates of the first focal point of each focusing point according to the Z-coordinates of the CCD 15 and the definitions of the images points in the first images. A detailed description of step S45 is illustrated below referring to FIG. 7.

Figure 5:
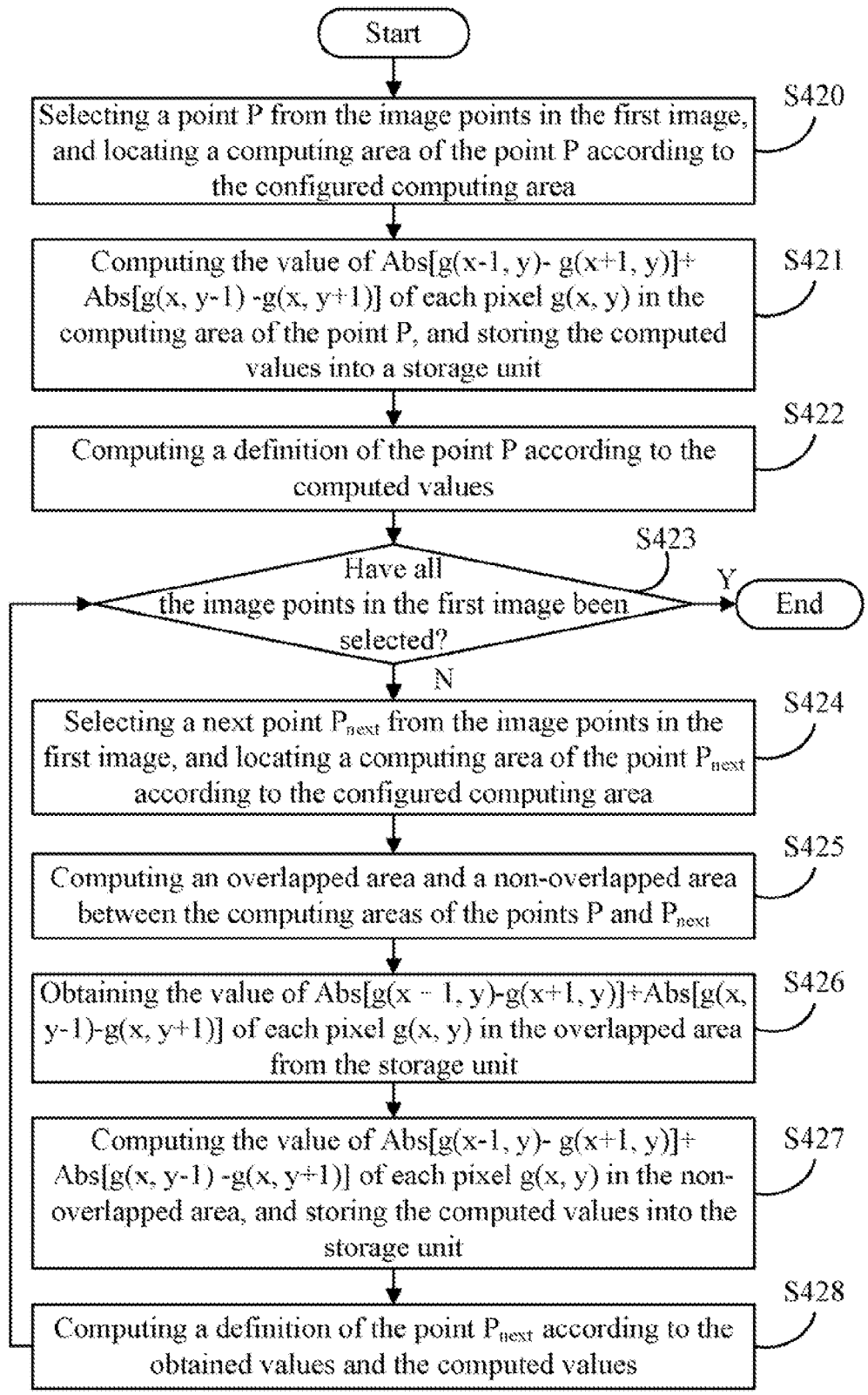
FIG. 5 is a flowchart of one embodiment of a detailed description of step S42 in FIG. 4.

FIG. 5 is a flowchart of one embodiment of a detailed description of step S42 in FIG. 4. Depending on the embodiment, additional steps may be added, others removed, and the ordering of the steps may be changed.

In step S420, the computation module 102 selects a point P from the image points in the first image, and locates a computing area of the point P according to the configured computing area. For example, the coordinates of the point P are (X3, Y3) and the configured computing area is 6*6 pixels, therefore the computing area of the point P is bounded by the coordinates $\{(0, 0), (X6, 0), (X6, Y6), (0, Y6)\}$.

In step S421, the computation module 102 computes the value of $Abs[g(x-1, y)-g(x+1, y)]+Abs[g(x, y-1)-g(x, y+1)]$, where $g(x, y)$ is a gray value of a pixel $(x, y)$ in the computing area of the image point P, and stores the computed values into the storage unit 12.

In step S422, the computation module 102 computes a definition of the point P according to the computed values. In one embodiment, the definition of the point P is $\Sigma\{Abs[g(x-1, y)-g(x+1, y)]+Abs[g(x, y-1)-g(x, y+1)]\}$.

In step S423, the computation module 102 determines if all the image points in the first image have been selected. Step S424 is implemented if all the image points in the first image have been selected. Otherwise, the process in FIG. 5 ends.

In step S424, the computation module 102 selects a point $P_{next}$ which is next to the point P, from the image points in the first image, and locates a computing area of the point $P_{next}$ according to the configured computing area. For example, the coordinates of the point $P_{next}$ is (X4, Y3), the computing area of the point $P_{next}$ is bounded by the coordinates $\{(X1, 0), (X7, 0), (X7, Y6), (X1, Y6)\}$.

Figure 6A:
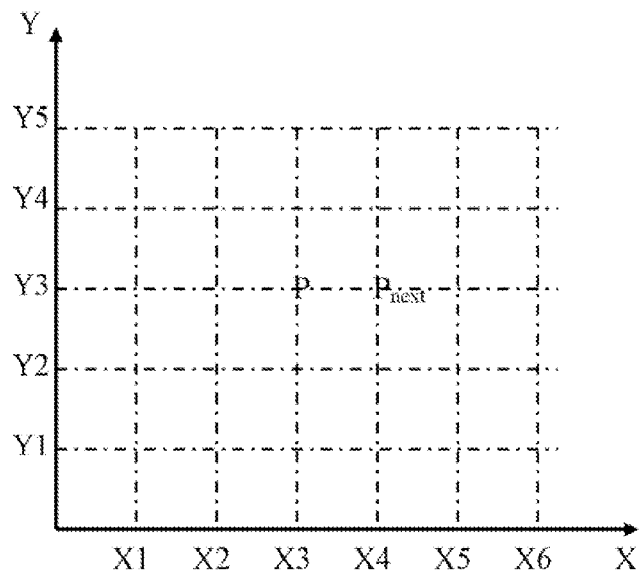
FIGS. 6A and 6B illustrate an overlapped computing area and a non-overlapped computing area.
Figure 6B:
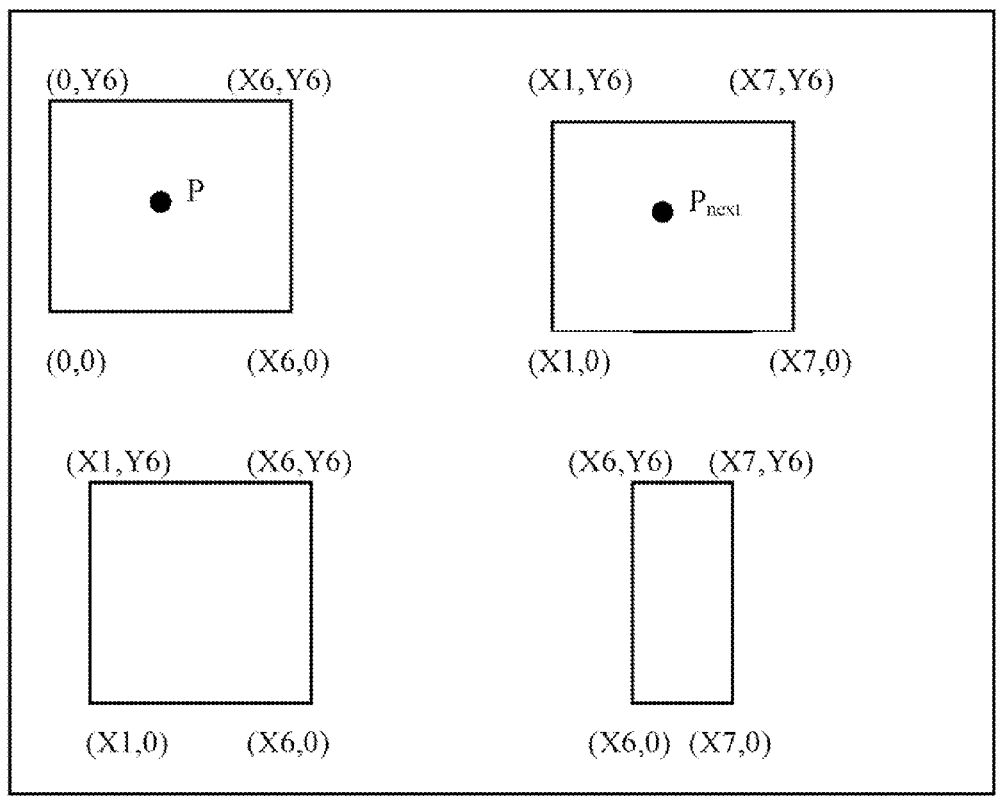

In step S425, the computation module 102 computes an overlapped computing area and a non-overlapped computing area between the computing areas of the point P and the point $P_{next}$. FIG. 6A and FIG. 6B show the overlapped computing area between the computing areas of the point P and the point $P_{next}$, which is bounded by the coordinates $\{(X1, 0), (X6, 0), (X6, Y6), (X1, Y6)\}$, and the non-overlapped computing area between the computing areas of the point P and the point $P_{next}$, which is bounded by the coordinates $\{(X6, 0), (X7, 0), (X7, Y6), (X6, Y6)\}$.

In step S426, the computation module 102 obtains the value of $Abs[g(x-1, y)-g(x+1, y)]+Abs[g(x, y-1)-g(x, y+1)]$ of each pixel in the overlapped area from the storage unit 12.

In step S427, the computation module 102 computes the value of $Abs[g(x-1, y)-g(x+1, y)]+Abs[g(x, y-1)-g(x, y+1)]$ in the non-overlapped computing area, and stores the computed values into the storage unit 12.

In step S428, the computation module 102 computes a definition of the point $P_{next}$ according to the obtained values and the computed values. In one embodiment, the definition of the point P is 1 $\{Abs[g(x-1, y)-g(x+1, y)]+Abs[g(x, y-1)-g(x, y+1)]\}$.

Figure 7:
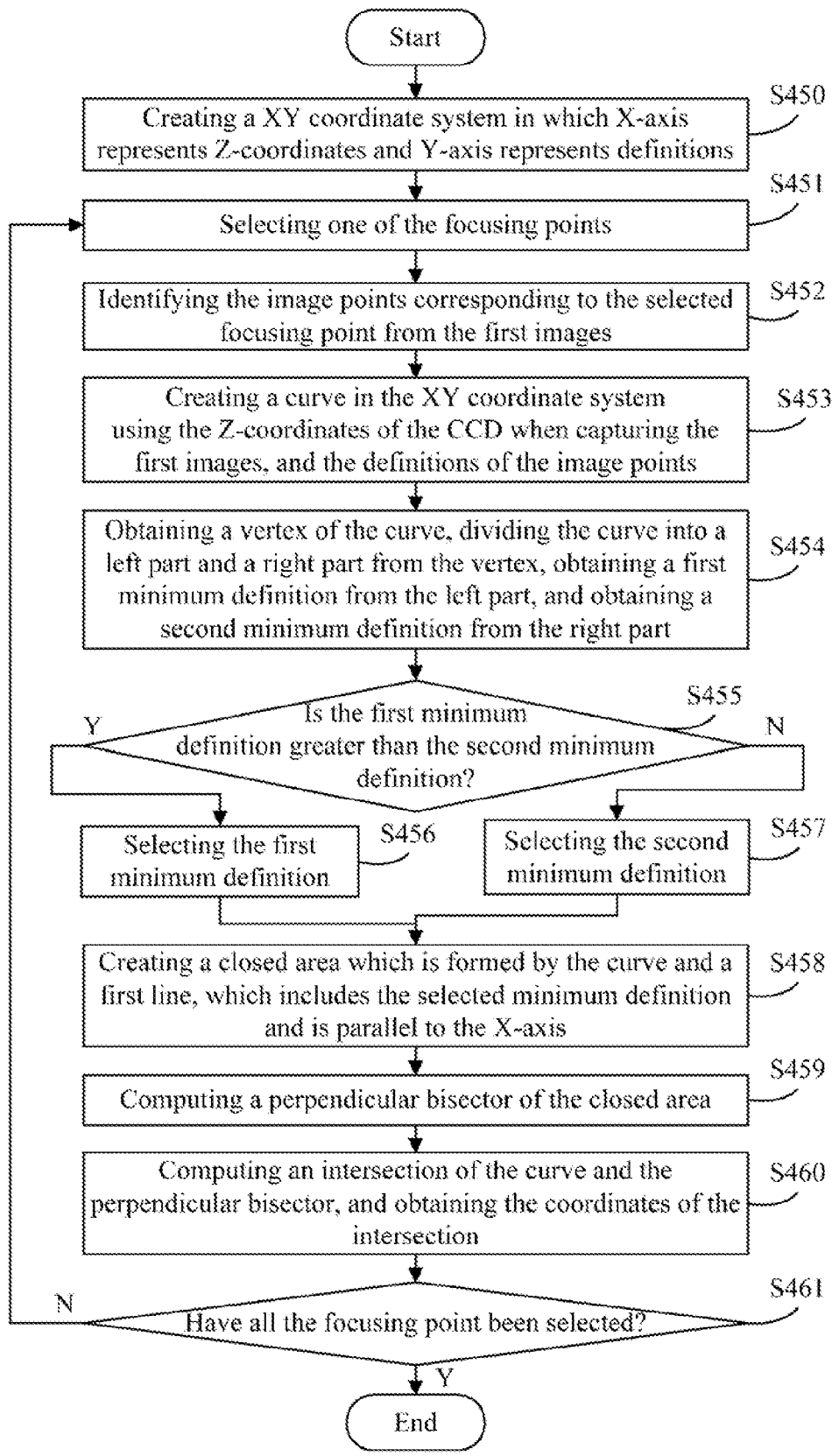
FIG. 7 is a flowchart of one embodiment of a detailed description of step S45 in FIG. 4.

FIG. 7 is a flowchart of one embodiment of a detailed description of step S45 in FIG. 4. Depending on the embodiment, additional steps may be added, others removed, and the ordering of the steps may be changed.

In step S450, the computation module 102 creates an XY coordinate system in which X-axis represents Z-coordinates and Y-axis represents definitions.

In step S451, the computation module 102 selects one of the focusing points, and in step S452, the computation module 102 identifies the image points corresponding to the selected focusing point from all the first images.

In step S453, the computation module 102 creates a curve in the XY coordinate system using the Z-coordinate of the CCD 15 when the CCD 15 captures each of the first images, and further using the definitions of the image points corresponding to the selected focusing point. An example of the curve is the curve C in FIG. 8.

In step S454, the computation module 102 obtains a vertex of the curve, divides the curve into a left part and a right part from the vertex, obtains a first minimum definition from the left part and obtains a second minimum definition from the right part.

In step S455, the computation module 102 determines if the first minimum definition is greater than the second minimum definition. Step S456 is implemented if the first minimum definition is greater than the second minimum definition. Otherwise, step S457 is implemented if the second minimum definition is greater than the first minimum definition.

In step S456, the computation module 102 selects the first minimum definition, or in step S457, the computation module 102 selects the second minimum definition.

Figure 8:
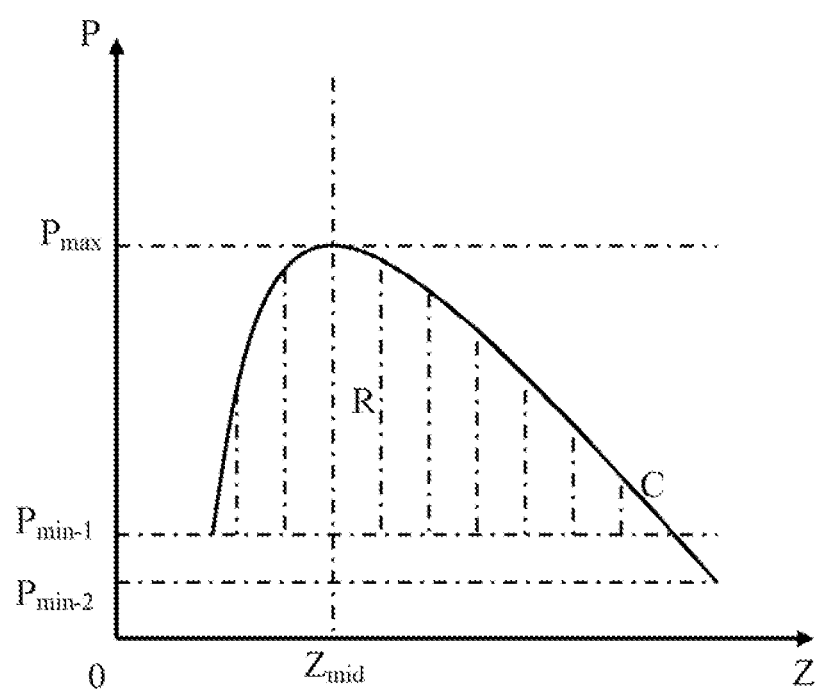
FIG. 8 is an example illustrating a created curve, a closed area, and a perpendicular bisector.

In step S458, the computation module 102 creates a closed area, like the closed area R in FIG. 8, which is formed by the curve and a first line which includes the selected minimum definition and is parallel to the X-axis of the XY coordinate system.

In step S459, the computation module 102 computes a perpendicular bisector of the closed area. A detailed description of step S459 is illustrated below referring to FIG. 9.

In step S460, the computation module 102 computes an intersection of the curve and the perpendicular bisector, and obtains the coordinates of the intersection. The coordinates of the intersection is the first focal point of the selected focusing point.

In step S461, the computation module 102 determines if all the focusing points have been selected. Step S451 is repeated if all the focusing points have been selected. Otherwise, the process of FIG. 7 ends.

Figure 9:
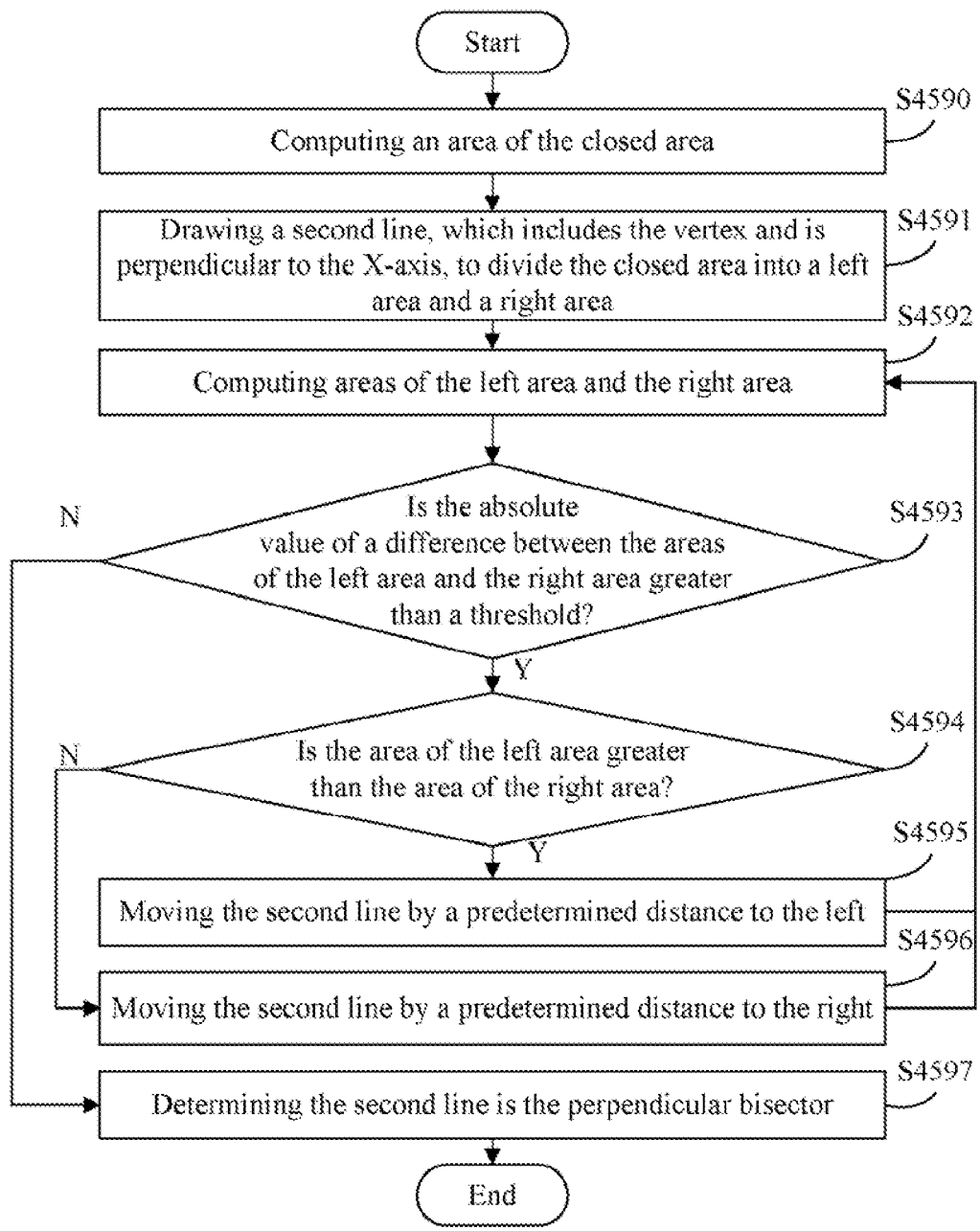
FIG. 9 is a flowchart of one embodiment of a detailed description of step S459 in FIG. 7.

FIG. 9 is a flowchart of one embodiment of a detailed description of step S459 in FIG. 7. Depending on the embodiment, additional steps may be added, others removed, and the ordering of the steps may be changed.

In step S4590, the computation module 102 computes an area of the closed area. In one embodiment, the area of the closed area is computed using the formula illustrated in FIG. 10.

In step S4591, the computation module 102 draws a second line which includes the vertex and is perpendicular to the X-axis of the XY coordinate system, to divide the closed area into a left area and a right area.

In step S4592, the computation module 102 computes an area of the left area and an area of the right area using the formula in FIG. 10.

In step S4593, the computation module 102 determines if the absolute value of a difference between the areas of the left area and the right area is greater than a threshold. The threshold may be predetermined by a user. It may be understood that, the smaller the threshold is, the more accurate the perpendicular bisector is. Step S4597 is implemented if the absolute value is less than or equal to the threshold, the computation module 102 determines the second line is the perpendicular bisector. Otherwise, step S4594 is implemented if the absolute value is greater than the threshold.

In step S4594, the computation module 102 determines if the area of the left area is greater than the area of the right area. Step S4595 is implemented if the measurement of the left area is greater than the measurement of the right area. Otherwise, step S4596 is implemented if the measurement of the right area is greater than the measurement of the left area.

In step S4595, the computation module 102 moves the second line by a predetermined distance to the left, or in step S4596, the computation module 102 moves the second line by a predetermined distance to the right. The predetermined distance may be 1 pixel for example. After step S4595 or step S4596, step S4592 is repeated.

It should be emphasized that the above-described embodiments of the present disclosure, particularly, any embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A method of focusing on points of objects using a measuring device, the measuring device comprising a charge coupled device (CCD), the method being performed by execution of computerized code by a processor of the measuring device and comprising:
    (a) selecting one or more focusing points on an object;
    (b) positioning the CCD at the top of an initial focusing range, and moving the CCD from the top to the bottom of the initial focusing range at a first speed;
    (c) capturing a plurality of first images of the object during the movement from the top to the bottom of the initial focusing range, identifying an image point corresponding to each focusing point in each first image, computing coordinates of a first focal point of each focusing point according to the image points;
    (d) updating the initial focusing range according to Z-coordinates of the coordinates of the first focal points to generated an updated focusing range;
    (e) positioning the CCD at the bottom of the updated focusing range, and moving the CCD from the bottom to the top of the updated focusing range at a second speed;
    (f) capturing a plurality of second images of the object during the movement from the bottom to the top of the updated focusing range, identifying an image point corresponding to each focusing point in each second image, computing coordinates of a second focal point of each focusing point according to the image points in the second images; and
    (g) outputting the coordinates of the second focal points of the focusing points using a display of the measuring device.

2. The method according to claim 1, wherein the first speed is greater than the second speed.

3. The method according to claim 1, wherein step (c) comprises:

(c1) obtaining a Z-coordinate of the CCD when the CCD captures a first images of the object;

(c2) locating a computing area of each image point in the first image according to a configured computing area, and computing a definition of each image point according to gray values of all pixels in the corresponding computing area;

(c3) repeating steps (c1) and (c2) during the CCD moving from the top to bottom of the initial focusing range; and (c4) determining the coordinates of the first focal point of each focusing point according to the Z-coordinates of the CCD and the definitions of the images points in the first images.

4. The method according to claim 3, wherein step (c2) comprises:

(c20) selecting a point P from the image points in the first image, and locating a computing area of the point P according to the configured computing area;

(c21) computing the value of $Abs[g(x-1, y)-g(x+1, y)] + Abs[g(x, y-1)-g(x, y+1)]$, wherein $g(x, y)$ is a gray value of a pixel $(x, y)$ in the computing area of the image point P, and storing the computed values into a storage unit of the measuring device;

(c22) computing a definition of the point P according to the computed values, wherein the definition of the point P is $\Sigma\{Abs[g(x-1, y)-g(x+1, y)] + Abs[g(x, y-1)-g(x, y+1)]\}$;

(c23) selecting a point $P_{next}$ which is next to the point P, from the image points in the first image, and locating a computing area of the point $P_{next}$ according to the configured computing area;

(c24) computing an overlapped computing area and a non-overlapped computing area between the computing areas of the point P and the point $P_{next}$;

(c25) obtaining the value of $Abs[g(x-1, y)-g(x+1, y)] + Abs[g(x, y-1)-g(x, y+1)]$ of each pixel in the overlapped area from the storage unit;

(c26) computing the value of $Abs[g(x-1, y)-g(x+1, y)] + Abs[g(x, y-1)-g(x, y+1)]$ in the non-overlapped computing area, and storing the computed values into the storage unit;

(c27) computing a definition of the point $P_{next}$ according to the obtained values and the computed values, wherein the definition of the point P is $\Sigma\{Abs[g(x-1, y)-g(x+1, y)] + Abs[g(x, y-1)-g(x, y+1)]\}$; and (c28) repeating steps (c23) to (c27) until all the image points in the first image have been selected.

5. The method according to claim 3, wherein step (c4) comprises:

(c40) creating an XY coordinate system in which X-axis represents Z-coordinates of the CCD and Y-axis represents definitions of the image points;

(c41) selecting one of the focusing points, identifying the image points corresponding to the selected focusing point from the first images;

(c42) creating a curve in the XY coordinate system using the Z-coordinates of the CCD and the definitions of the image points corresponding to the selected focusing point;

(c43) obtaining a vertex of the curve, dividing the curve into a left part and a right part from the vertex, obtaining a first minimum definition from the left part and obtaining a second minimum definition from the right part;

(c44) selecting the first minimum definition upon condition that the first minimum definition is greater than the second minimum definition, or selecting the second minimum definition upon condition that the first minimum definition is less than the second minimum definition;

(c45) creating a closed area which is formed by the curve and a first line, which includes the selected minimum definition and is parallel to the X-axis of the XY coordinate system;

(c46) computing a perpendicular bisector of the closed area;

(c47) computing an intersection of the curve and the perpendicular bisector, and obtaining the coordinates of the intersection, wherein the coordinates of the intersection is the first focal point of the selected focusing point; and (c48) repeating steps (c41) to (c47) until all the focusing points have been selected.

6. The method according to claim 5, wherein the step (c46) comprises:

(c460) computing an area of the closed area;

(c461) drawing a second line, which includes the vertex and is perpendicular to the X-axis of the XY coordinate system, to divide the closed area into a left area and a right area;

(c462) computing areas of the left area and the right area;

(c463) determining the second line is the perpendicular bisector upon condition that the absolute value of a difference between the areas of the left area and the right area is less than or equal to a threshold;

(c464) moving the second line by a predetermined distance to the left, upon condition that the absolute value is greater than the threshold and the area of the left area is greater than the area of the right area, or moving the second line by a predetermined distance to the right, upon condition that the absolute value is greater than the threshold, and the area of the right area is greater than the area of the left area; and (c465) repeating step (c463).

7. A measuring device, comprising:
a charge coupled device (CCD);
a display;
a non-transitory storage medium;
at least one processor; and
one or more modules that are stored in the non-transitory storage medium; and are executed by the at least one processor, the one or more modules comprising instructions to:

(a) select one or more focusing points on an object;

(b) position the CCD at the top of an initial focusing range, and move the CCD from the top to the bottom of the initial focusing range at a first speed;

(c) capture a plurality of first images of the object during the movement from the top to the bottom of the initial focusing range, identify an image point corresponding to each focusing point in each first image, compute coordinates of a first focal point of each focusing point according to the image points;

(d) update the initial focusing range according to Z-coordinates of the coordinates of the first focal points to generated an updated focusing range;

(e) position the CCD at the bottom of the updated focusing range, and move the CCD from the bottom to the top of the updated focusing range at a second speed;

(f) capture a plurality of second images of the object during the movement from the bottom to the top of the updated focusing range, identify an image point corresponding to each focusing point in each second image, compute coordinates of a second focal point of each focusing point according to the image points in the second images; and (g) output the coordinates of the second focal points of the focusing points using the display.

8. The measuring device according to claim 7, wherein the first speed is greater than the second speed.

9. The measuring device according to claim 7, wherein the instructions in step (c) further to:
(c1) obtain a Z-coordinate of the CCD when the CCD captures a first images of the object;
(c2) locate a computing area of each image point in the first image according to a configured computing area, and compute a definition of each image point according to gray values of all pixels in the corresponding computing area;
(c3) repeat steps (c1) and (c2) during the CCD moving from the top to bottom of the initial focusing range; and
(c4) determine the coordinates of the first focal point of each focusing point according to the Z-coordinates of the CCD and the definitions of the images points in the first images.

10. The measuring device according to claim 9, wherein the instructions in step (c2) further to
(c20) select a point P from the image points in the first image, and locate a computing area of the point P according to the configured computing area;
(c21) compute the value of $Abs[g(x-1, y)-g(x+1, y)]+Abs[g(x, y-1)-g(x, y+1)]$, wherein $g(x, y)$ is a gray value of a pixel $(x, y)$ in the computing area of the image point P, and store the computed values into a storage unit of the measuring device;
(c22) compute a definition of the point P according to the computed values, wherein the definition of the point P is $\Sigma\{Abs[g(x-1, y)-g(x+1, y)]+Abs[g(x, y-1)-g(x, y+1)]\}$;
(c23) select a point $P_{next}$ which is next to the point P, from the image points in the first image, and locate a computing area of the point $P_{next}$ according to the configured computing area;
(c24) compute an overlapped computing area and a non-overlapped computing area between the computing areas of the point P and the point $P_{next}$;
(c25) obtain the value of $Abs[g(x-1, y)-g(x+1, y)]+Abs[g(x, y-1)-g(x, y+1)]$ of each pixel in the overlapped area from the storage unit;
(c26) compute the value of $Abs[g(x-1, y)-g(x+1, y)]+Abs[g(x, y-1)-g(x, y+1)]$ in the non-overlapped computing area, and store the computed values into the storage unit;
(c27) compute a definition of the point $P_{next}$ according to the obtained values and the computed values, wherein the definition of the point P is $\Sigma\{Abs[g(x-1, y)-g(x+1, y)]+Abs[g(x, y-1)-g(x, y+1)]\}$; and
(c28) repeat steps (c23) to (c27) until all the image points in the first image have been selected.

11. The measuring device according to claim 9, wherein the instructions in step (c4) further to:
(c40) create an XY coordinate system in which X-axis represents Z-coordinates of the CCD and Y-axis represents definitions of the image points;
(c41) select one of the focusing points, identify the image points corresponding to the selected focusing point from the first images;
(c42) create a curve in the XY coordinate system using the Z-coordinates of the CCD and the definitions of the image points corresponding to the selected focusing point;
(c43) obtain a vertex of the curve, dividing the curve into a left part and a right part from the vertex, obtain a first minimum definition from the left part and obtain a second minimum definition from the right part;
(c44) select the first minimum definition upon condition that the first minimum definition is greater than the second minimum definition, or select the second minimum definition upon condition that the first minimum definition is less than the second minimum definition;
(c45) create a closed area which is formed by the curve and a first line, which includes the selected minimum definition and is parallel to the X-axis of the XY coordinate system;
(c46) compute a perpendicular bisector of the closed area;
(c47) compute an intersection of the curve and the perpendicular bisector, and obtaining the coordinates of the intersection, wherein the coordinates of the intersection is the first focal point of the selected focusing point; and
(c48) repeat steps (c41) to (c47) until all the focusing points have been selected.

12. The measuring device according to claim 11, wherein the instructions in step (c46) further to:
(c460) compute an area of the closed area;
(c461) draw a second line, which includes the vertex and is perpendicular to the X-axis of the XY coordinate system, to divide the closed area into a left area and a right area;
(c462) compute the areas of the left area and the right area;
(c463) determine the second line is the perpendicular bisector upon condition that the absolute value of a difference between the areas of the left area and the right area is less than or equal to a threshold;
(c464) move the second line by a predetermined distance to the left, upon condition that the absolute value is greater than the threshold and the area of the left area is greater than the area of the right area, or move the second line by a predetermined distance to the right, upon condition that the absolute value is greater than the threshold, and the area of the right area is greater than the area of the left area; and
(c465) repeat step (c463).

13. A non-transitory storage medium having stored thereon instructions that, when executed by a processor of a measuring device, causes the processor to perform a method of focusing on points on objects using a measuring device, the measuring device comprises a charge coupled device (CCD), wherein the method comprises:
(a) selecting one or more focusing points on an object;
(b) positioning the CCD at the top of a initial focusing range, and moving the CCD from the top to the bottom of the initial focusing range at a first speed;
(c) capturing a plurality of first images of the object during the movement from the top to the bottom of the initial focusing range, identifying an image point corresponding to each focusing point in each first image, computing coordinates of a first focal point of each focusing point according to the image points;
(d) updating the initial focusing range according to Z-coordinates of the coordinates of the first focal points to generated an updated focusing range;
(e) positioning the CCD at the bottom of the updated focusing range, and moving the CCD from the bottom to the top of the updated focusing range at a second speed;
(f) capturing a plurality of second images of the object during the movement from the bottom to the top of the updated focusing range, identifying an image point corresponding to each focusing point in each second image, computing coordinates of a second focal point of each focusing point according to the image points in the second images; and (g) outputting the coordinates of the second focal points of the focusing points using a display of the measuring device.

14. The non-transitory storage medium according to claim 13, wherein the first speed is greater than the second speed.

15. The non-transitory storage medium according to claim 13, wherein step (c) comprises:

(c1) obtaining a Z-coordinate of the CCD when the CCD captures a first images of the object;

(c2) locating a computing area of each image point in the first image according to a configured computing area, and computing a definition of each image point according to gray values of all pixels in the corresponding computing area;

(c3) repeating steps (c1) and (c2) during the CCD moving from the top to bottom of the initial focusing range; and (c4) determining the coordinates of the first focal point of each focusing point according to the Z-coordinates of the CCD and the definitions of the images points in the first images.

16. The non-transitory storage medium according to claim 15, wherein step (c2) comprises:

(c20) selecting a point P from the image points in the first image, and locating a computing area of the point P according to the configured computing area;

(c21) computing the value of $Abs[g(x-1, y)-g(x+1, y)]+Abs[g(x, y-1)-g(x, y+1)]$, wherein $g(x, y)$ is a gray value of a pixel $(x, y)$ in the computing area of the image point P, and storing the computed values into a storage unit of the measuring device;

(c22) computing a definition of the point P according to the computed values, wherein the definition of the point P is $\Sigma\{Abs[g(x-1, y)-g(x+1, y)]+Abs[g(x, y-1)-g(x, y+1)]\}$;

(c23) selecting a point $P_{next}$ which is next to the point P, from the image points in the first image, and locating a computing area of the point $P_{next}$ according to the configured computing area;

(c24) computing an overlapped computing area and a non-overlapped computing area between the computing areas of the point P and the point $P_{next}$;

(c25) obtaining the value of $Abs[g(x-1, y)-g(x+1, y)]+Abs[g(x, y-1)-g(x, y+1)]$ of each pixel in the overlapped area from the storage unit;

(c26) computing the value of $Abs[g(x-1, y)-g(x+1, y)]+Abs[g(x, y-1)-g(x, y+1)]$ in the non-overlapped computing area, and storing the computed values into the storage unit;

(c27) computing a definition of the point $P_{next}$ according to the obtained values and the computed values, wherein the definition of the point P is $\Sigma\{Abs[g(x-1, y)-g(x+1, y)]+Abs[g(x, y-1)-g(x, y+1)]\}$; and (c28) repeating steps (c23) to (c27) until all the image points in the first image have been selected.

17. The non-transitory storage medium according to claim 15, wherein step (c4) comprises:

(c40) creating an XY coordinate system in which X-axis represents Z-coordinates of the CCD and Y-axis represents definitions of the image points;

(c41) selecting one of the focusing points, identifying the image points corresponding to the selected focusing point from the first images;

(c42) creating a curve in the XY coordinate system using the Z-coordinates of the CCD and the definitions of the image points corresponding to the selected focusing point;

(c43) obtaining a vertex of the curve, dividing the curve into a left part and a right part from the vertex, obtaining a first minimum definition from the left part and obtaining a second minimum definition from the right part;

(c44) selecting the first minimum definition upon condition that the first minimum definition is greater than the second minimum definition, or selecting the second minimum definition upon condition that the first minimum definition is less than the second minimum definition;

(c45) creating a closed area which is formed by the curve and a first line, which includes the selected minimum definition and is parallel to the X-axis of the XY coordinate system;

(c46) computing a perpendicular bisector of the closed area;

(c47) computing an intersection of the curve and the perpendicular bisector, and obtaining the coordinates of the intersection, wherein the coordinates of the intersection is the first focal point of the selected focusing point; and (c48) repeating steps (c41) to (c47) until all the focusing points have been selected.

18. The non-transitory storage medium according to claim 17, wherein the step (c46) comprises:

(c460) computing an area of the closed area;

(c461) drawing a second line, which includes the vertex and is perpendicular to the X-axis of the XY coordinate system, to divide the closed area into a left area and a right area;

(c462) computing areas s of the left area and the right area;

(c463) determining the second line is the perpendicular bisector upon condition that the absolute value of a difference between the areas of the left area and the right area is less than or equal to a threshold;

(c464) moving the second line by a predetermined distance to the left, upon condition that the absolute value is greater than the threshold and the area of the left area is greater than the area of the right area, or moving the second line by a predetermined distance to the right, upon condition that the absolute value is greater than the threshold, and the area of the right area is greater than the area of the left area; and (c465) repeating step (c463).

\* \* \* \* \*